DAVID ARONSON
HAROLD FLEIT
RICHARD E. JAPHET
INVENTORS

BY Daniel H. Bobis
Atty

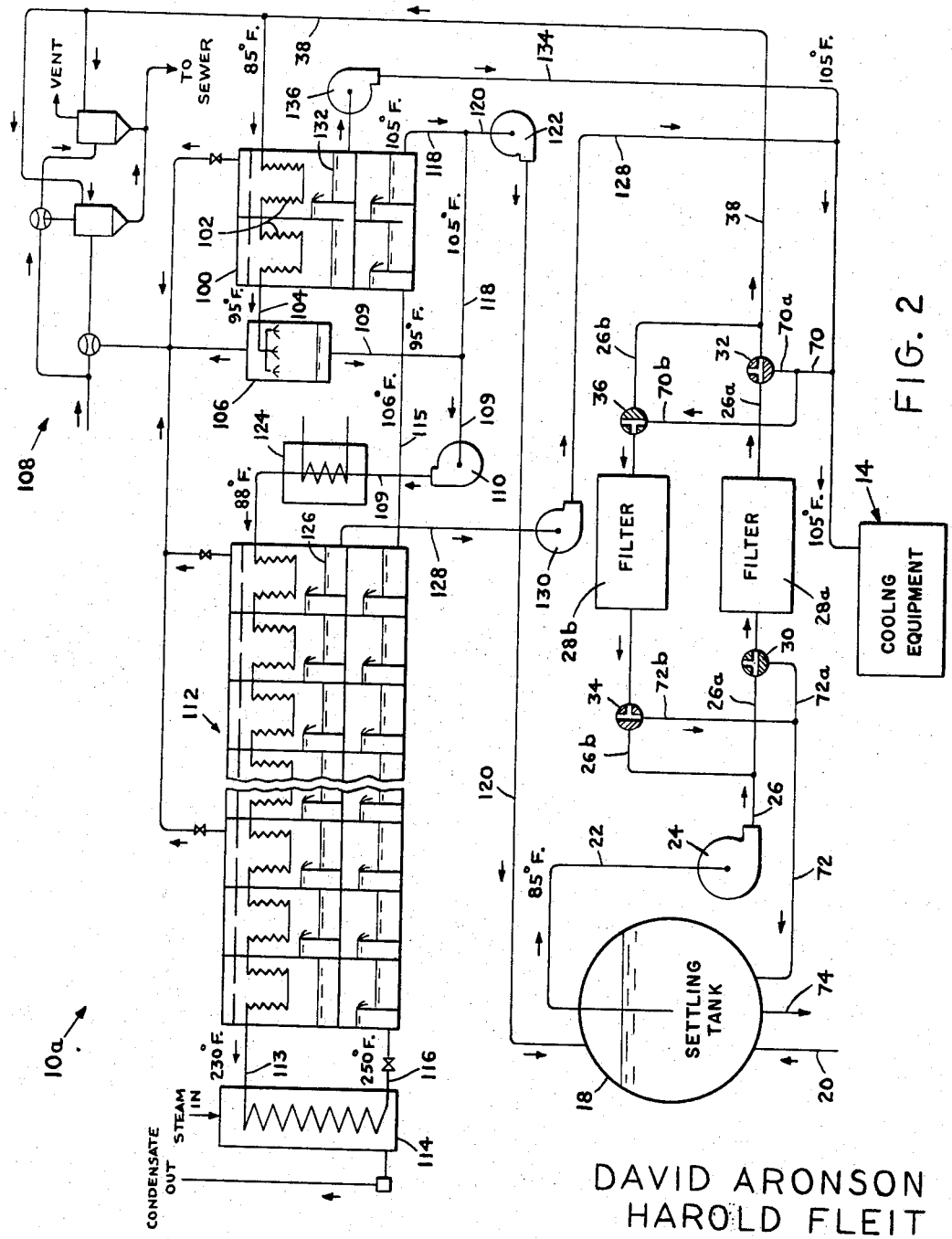

United States Patent Office 3,405,037
Patented Oct. 8, 1968

3,405,037
DISTILLAND TREATMENT WITH CONCENTRATE RECYCLE
David Aronson, Upper Montclair, Harold Fleit, Closter, and Richard E. Japhet, Livingston, N.J., assignors to Harrworth, Inc., a corporation of Delaware
Filed Oct. 4, 1965, Ser. No. 492,688
1 Claim. (Cl. 202—173)

ABSTRACT OF THE DISCLOSURE

Feed water is filtered and deaerated and then combined with a portion of the concentrate derived from a multistage flash distillation system. The combined stream is then cooled and used as the condensing cooling fluid prior to distillation in the multistage flash distillation system.

---

This invention relates to cooling water from an otherwise unacceptable source for use with evaporative cooling equipment. More particularly, the invention relates to the treatment of effluent at the site of the equipment so as to produce high quality cooling water for use with the evaporative cooling equipment.

Evaporative cooling equipment is characterized by the cooling being accomplished through the evaporation of at least a portion of the cooling water supplied thereto. Though such equipment uses a relatively small portion of water in comparison to cooling equipment or systems using a once-through flow of water without evaporation, the total quantity of water consumed may be unacceptable in the event of a water shortage caused by a drought or other unforeseen happening as these systems have make-up requirements to offset the water loss through evaporation.

Many types of evaporative cooling equipment are in use today. Some examples may be found in certain types of the following:

(1) internal combustion engines
(2) chemical process
(3) air conditioning services The air conditioning services in question operate by using evaporative cooling equipment such as a cooling tower or an evaporative condenser. If the service uses a cooling tower, water is circulated thereto and cooled by air and evaporation of a portion of the water. On the other hand if the service uses an evaporative condenser, the refrigerant will be condensed by means of the water evaporating on the surface of the condenser tube bundle.

In any case the evaporation requires that makeup water be continuously supplied to the evaporative cooling equipment.

The site at which the evaporative cooling equipment is situated will usually be accessible to an untreated supply of effluent. One illustration of this is a building having a self-contained water cooled air conditioning service. Any water makeup requirement can be met by recovering water from the building effluent. This invention contemplates removal of the water which forms the largest constituent of the effluent, and treating it by heat and evaporation so as to render it suitable for use in evaporative cooling equipment.

While it is not practical to establish independent sewage plants at the various locations which require cooling water, it is possible to install suitable treatment equipment to produce high quality water from the effluent.

One example of the treatment contemplated by the present invention is to introduce the effluent into a sewage settling tank and draw off the water therein for filtering so as to remove any solids. The filtrate is then heated to such temperatures as are necessary so that it is completely sterilized and thereafter be distilled as pure water, the two operations of sterilization and distillation being effected in the same system.

Accordingly, it is an object of this invention to provide a method and apparatus for treating effluent to produce cooling water for use in any type of evaporative cooling equipment; which method and apparatus may include backwashing of the filters with a portion of the distillate so as to remove any trapped solids therefrom.

Another object of this invention is to provide a system for treating effluent so as to render it safe and inoffensive for use in the evaporative cooling equipment; which system is relatively simple, reliable and economical; which system includes a filter which is backwashed with a portion of the treated water to remove solids therefrom; which system includes more than one filter so that the system may be operated simultaneously with the backwashing operation.

Other objects and advantages will be apparent from the following description of several embodiments of the invention and the novel features will be particularly pointed out hereinafter in the claim; reference being had to the accompanying drawing which forms a part of this specification. Furthermore, the phraseology or terminology employed herein is for purpose of description and not of limitation.

In the drawings:

FIGURE 2 is a diagrammatic illustration of a system embodying another form of the present invention.

Figure 1:
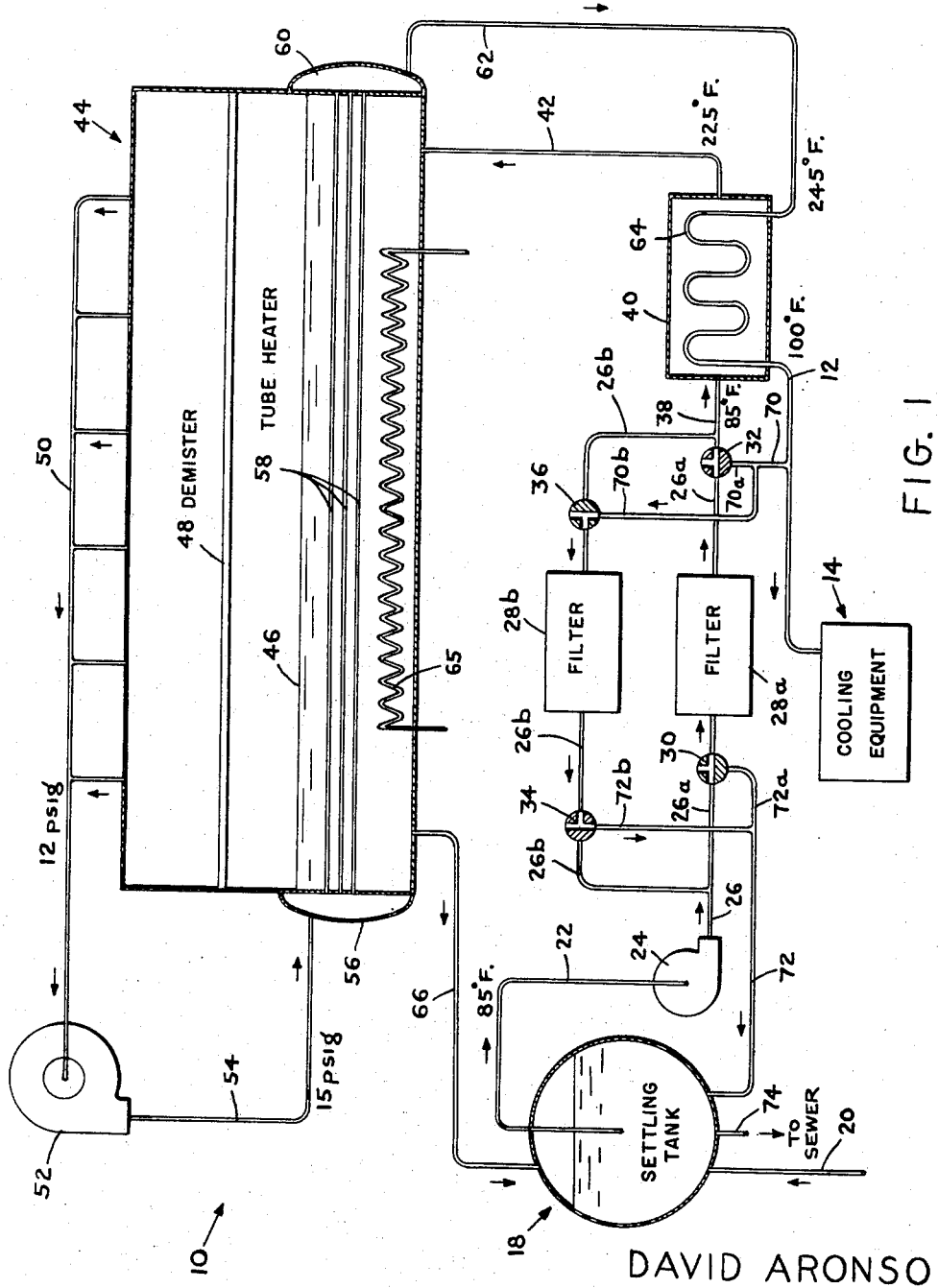
FIGURE 1 is a diagrammatic illustration of the system embodying one form of the present invention.

In the embodiment of the invention shown in FIGURE 1, the effluent will be treated in a system, designated generally as 10, from which the treated high quality water will be delivered in line 12 into the evaporative cooling equipment 14 or to storage tank (not shown) for use therein. This equipment 14 may be located at the same site which is the source of the effluent such as a building or shopping center.

Instead of immediately discharging the effluent into the sewer it is delivered into a settling tank 18 by line 20. In the settling tank 18 a portion of the water of the effluent will be drawn off in line 22 by the suction of pump 24 for discharge in line 26, which branches into lines 26a and 26b. Each branch 26a and 26b has a filtering means, namely, filters 28a and 28b, respectively, disposed therein. On either side of filter 28a a three-way valve, 30 and 32 is disposed in line 26a. Likewise, on either side of filter 28b a three-way valve 34 and 36 is disposed in line 26b. Valves 30, 32, 34 and 36 will be operated to control the direction of flow through filters 28a and 28b.

For example, the valves 30 and 32 have been set so that the direction of flow in line 26a is that which occurs during normal operation of system 10. Thus the flow will be in the direction as indicated by the arrows through filter 28a to filter the liquid and remove any entrained solids therein. Valves 36 and 34 in branch line 26b were set to permit flow in the opposite direction which flow will occur during the backwashing operation of filter 28b. Of course, the valves may be set in any desired direction so that either or both filters are operational, or either or both filters are being backwashed. Alternatively either filter may be taken out of operation, or additional lines connected to the existing lines so that more than two filters are utilized in the system.

Accordingly, the discharge from pump 24 enters line 26 and passes into branch line 26a wherein it will pass through filter 28a and be delivered therefrom by line 38 into heat exchanger 40. The filtrate will pass through the shell side of heat exchanger 40 and be preheated by passing in indirect heat exchange relation with the treated hot condensate. Line 42 will deliver the preheated filtrate into boiler 44 wherein additional heat will be added to convert the filtrate to steam having a pressure of about 12 p.s.i.g. This steam, by reason of its high temperature will be sterilized so that subsequently on the steam being condensed it will form pure distillate. The steam rises from the liquid surface 46 of the filtrate and passes through a mist and foam eliminator 48 to be drawn off in takeoff steam header 50 for introduction into a compressor or blower 52. The compressor or blower 52 may be of any suitable type such as centrifugal, roots or screw type, and be suitably driven by any suitable source of power such as a motor, engine, or turbine. The compressed steam is discharged from compressor 52 at a pressure of about 15 p.s.i.g. and delivered in line 54 into inlet manifold 56. Manifold 56 communicates with a heating tube bundle 58 which extends the length of boiler 44 and is disposed below the surface 46 of the filtrate. The steam passing through tube bundle 58 gives up heat to the filtrate and is thereby condensed. Outlet manifold 60 collects the hot condensate or distillate for discharge in condensate line 62. Condensate line 62 delivers the hot condensate into tube side coil 64 of heat exchanger 40 wherein the hot condensate is cooled by passing in indirect heat exchange relationship with the filtrate, to preheat the same. From coil 64 the condensate will enter discharge line 12 from which it will pass into the evaporative cooling equipment 14.

Supplemental heat may be selectively supplied to boiler 44 by means of a supplementary heater 65. The heater 65 may be energized by steam or electrical resistance elements or any other acceptable manner. By keeping the boiler at or above a predetermined temperature, both during operation and shutdown, the pressure can be maintained therein above atmospheric so as to avoid air in-leakage.

A blowdown line 66 may be connected between boiler 44 and settling tank 18 wherein a small portion of the fluid in the boiler is discarded through the blowdown line 66 as is common in boiler practice.

If the condensate in line 62 of a given system 10 enters coil 64 at a temperature of approximately 245° F., and the filtrate entering the heat exchanger through line 38 at approximately 85° F., the condensate and filtrate will pass in indirect counterflow heat exchange relation so that the filtrate is preheated on discharge into line 42 to 225° F., while the condensate is cooled to 100° F. Of course, these temperatures are illustrative only and may be changed to suit any design conditions within the scope of the present invention.

A backwash line 70 is associated with valves 32 and 36. Line 70 extends from line 12 and has branches 70a and 70b which connect into valves 32 and 36 respectively. A backwash discharge line 72 is associated with valves 30 and 34. Branches 72a and 72b of line 72 are connected to valves 30 and 34, respectively.

In the present illustration the valves are set so that line 26a delivers filtrate from filter 28a while line 26b can be used to backwash filter 28b. The valves could be reset to make filter 28b operational and have filter 28a backwashed.

In order to backwash filter 28a, a portion of the cooled condensate in discharge line 12 is passed into line 70. Valve 32 is closed to branch 70a, while valve 36 is open to branch 70b. Accordingly the backwash water will flow in the direction indicated by the arrows in lines 70 and 70b, through valve 36, to backwash filter 28b and pass through the portion of branch 26b between the valves to valve 34 which passes the water to branch 72b and finally to outlet line 72 from which the backwash is delivered to settling tank 18 for reprocessing of the liquid therein.

Any solids in the effluent collected in settling tank 18 will be discharged therefrom in line 74 into any convenient sewer (not shown).

In the embodiment of the invention illustrated in FIGURE 2, the effluent will be treated in a system designated generally as 10a which system includes a settling tank 18, pump 24 and filters 28a and 28b connected to each other in a substantially similar manner as described hereinbefore for system 10 as shown in FIGURE 1. Once again the treated high quality water will be delivered in line 12 to either a storage tank (not shown) or directly to the evaporative cooling equipment 14 as was done in system 10.

The backwash operations of filters 28a and 28b of FIGURE 2 is also substantially the same for system 10a as that of system 10 with the valves 30, 32, 34 and 36 and the direction of flow in lines 26a and 26b being shown similar thereto.

Accordingly the effluent from a building drain (not shown) is delivered by line 20 into settling tank 18. The liquid therein will be drawn off in line 22 into pump 24 and discharged into line 26 for passage through filter 28a and finally delivered to line 38. From line 38 the filtrate will pass into heat exchanger 100.

The filtrate will pass through the tube side 102 of heat exchanger 100 and be preheated by passing in indirect heat exchange relation with condensing vapor released from warm recycle liquid as it flashes from a higher to a somewhat lower temperature. This preheated feed will then be delivered by line 104 to degasifier 106 where vacuum producing equipment 108 will draw off noncondensible vapors along with some portion of condensible vapors, in a manner common to and well known in the treatment of boiler feed water.

The degassed filtrate will be transferred from degasifier 106 in line 109 by pump 110 to a series of flash heaters 112. These heaters 112 operate in fashion similar to the preheater 100, having the filtrate pass through the tubes in indirect heat transfer with vapors evolved from flashing liquids going from a higher to a lower temperature in a series of cascades. From the final stage of such heating, the filtrate will pass in line 113 to a booster feed heater 114 supplied with heat produced by an external heat source (not shown) such as steam or hot water. The feed then after this additional heating operation will pass from heater 114 in line 116 to enter the flashing cascade side of the series of heaters 112, where the feed will cool down by virtue of evaporation occurring as the pressure drops to that which is in equilibrium with the vapor condensing on the outside of the tubes of heaters 112 which are preheating the feed. A portion of the feed in heaters 112 will be passed in line 115 to enter the flashing cascade side of preheater 100. Commonly, this process of heating with flashing liquid is described as multiflash evaporation, and is disclosed in U.S. Patent 2,459,302 of D. Aronson.

The product leaving the coolest stage of the heater 100 will pass in line 118 to combine with the degassed feed of line 109 to be pumped back into the heater 112 for further heating and flashing, except for a small amount in line 120 blown down and pumped out by means of pump 122. The combined flow in line 109 on the discharge side of pump 110 will pass through cooler 124 to be cooled therein prior to entering the series of heaters 112. The feed to heaters 112 is heated therein and after passage through booster feed heater 114 will be returned to heaters 112 wherein it will be flashed to give the final distillate as product. This distillate is collected in condensate collecting portion 126 of heater 112 and pumped therefrom in line 128 by pump 130. Simultaneously distillate is collected in condensate collecting portion 132 of preheater 100 and pumped therefrom in line 134 by pump 136. The product in lines 128 and 134 will each be discharged and combine in line 12 from which it will enter either a storage tank (not shown) or the evaporative cooling equipment 114. Of course the lines 128 and 134 could be connected to form a single pump instead of separately by pumps 130 and 136, respectively.

Any solids in the effluent collected in the settling tank 18 of system 100 will be discharged therefrom in line 74, as was done in system 10.

Assuming a particular design of given capacity for system 10a of FIGURE 2, the temperatures indicated at the various points in the system are characterized for illustrative purposes only and may be changed to suit any design conditions within the scope of the present invention.

It will be understood that various changes in the details, materials, arrangement of parts and operating conditions which have been herein described and illustrated in order to explain the nature of the invention may be made by those skilled in the art within the principles and scope of the invention as expressed in the claim.

What is claimed is:

1. A system for producing distillate cooling water comprising plural multistage flash evaporating sections wherein feed water is successively flashed in the respective sections, means introducing the feed into a settling tank and then through alternately operated filters, means conducting the filtered feed through preheaters in the condensing zone of the first of said evaporating sections and thence into a deaerator, means conducting the deaerated feed through a cooler heat exchange zone and thence through a condensing conduit in the condensing zone of the second of said evaporating sections, means for further heating the feed, heat exchange means for elevating the further-heated feed to its highest temperature, means successively flashing the heated feed through said second section and thence through the first section, means for combining at least a portion of the concentrate from the end of the first section and combining it with a feed intermediate the deaeration and cooling of the feed, common means venting the first and second sections and the deaerator, and evaporative cooling equipment for further cooling the recovered distillate from the sections.

References Cited

UNITED STATES PATENTS

| 3,249,438 | 5/1966 | Topol | 202—176 X |
|---|---|---|---|
| 3,351,120 | 11/1967 | Goeldner et al. | 202—174 X |
| 1,328,998 | 1/1920 | Jones | 202—202 X |
| 1,962,153 | 6/1934 | Peterkin | 202—200 X |
| 2,185,595 | 1/1940 | Kleinschmidt | 203—23 |
| 2,199,320 | 4/1940 | Le Juge | 202—202 X |
| 2,379,519 | 7/1945 | Hall | 203—23 X |
| 2,389,064 | 11/1945 | Latham | 203—26 |
| 2,525,000 | 10/1950 | Seligman et al. | 210—340 |
| 2,893,926 | 7/1959 | Worthen et al. | 202—173 X |
| 2,924,557 | 2/1960 | DeFuria | 202—176 X |
| 3,056,499 | 10/1962 | Liddell | 210—82 X |
| 3,249,517 | 5/1966 | Lockman | 202—173 X |

OTHER REFERENCES

Saline Water Conversion Report (1963), pp. 18, 88, 107, 146, 147, and 148.

Saline Water Conversion Report (1964), pp. 142, 143, and 144.

NORMAN YUDKOFF, *Primary Examiner.*

F. E. DRUMMOND, *Assistant Examiner.*